June 12, 1923.
C. L. SAVIEO
1,458,363
BLADE ADJUSTING MECHANISM FOR CUTTER HEADS
Filed April 21, 1921     2 Sheets-Sheet 2
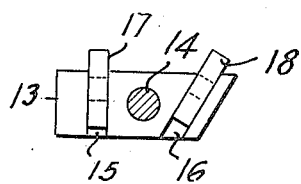
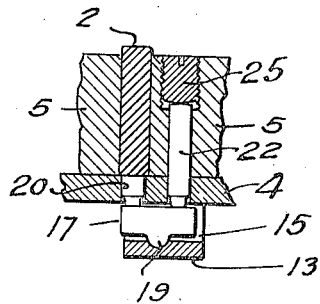
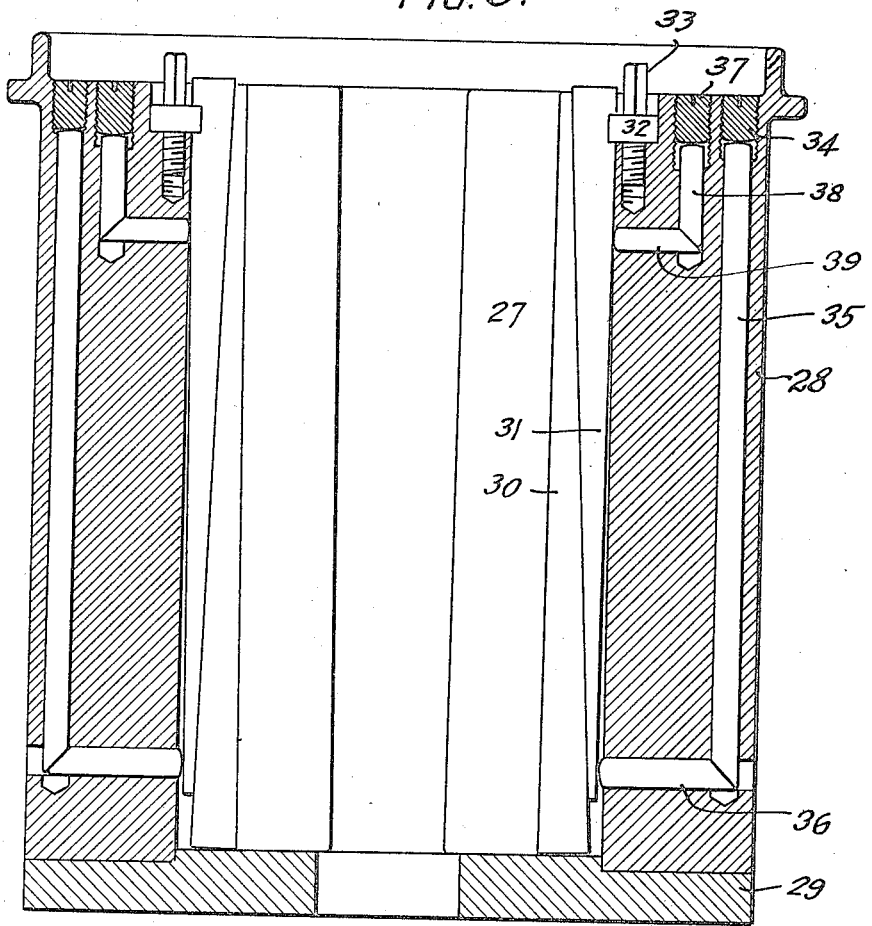
INVENTOR
CHARLES L. SAVIEO
BY
ATTORNEY Patented June 12, 1923.

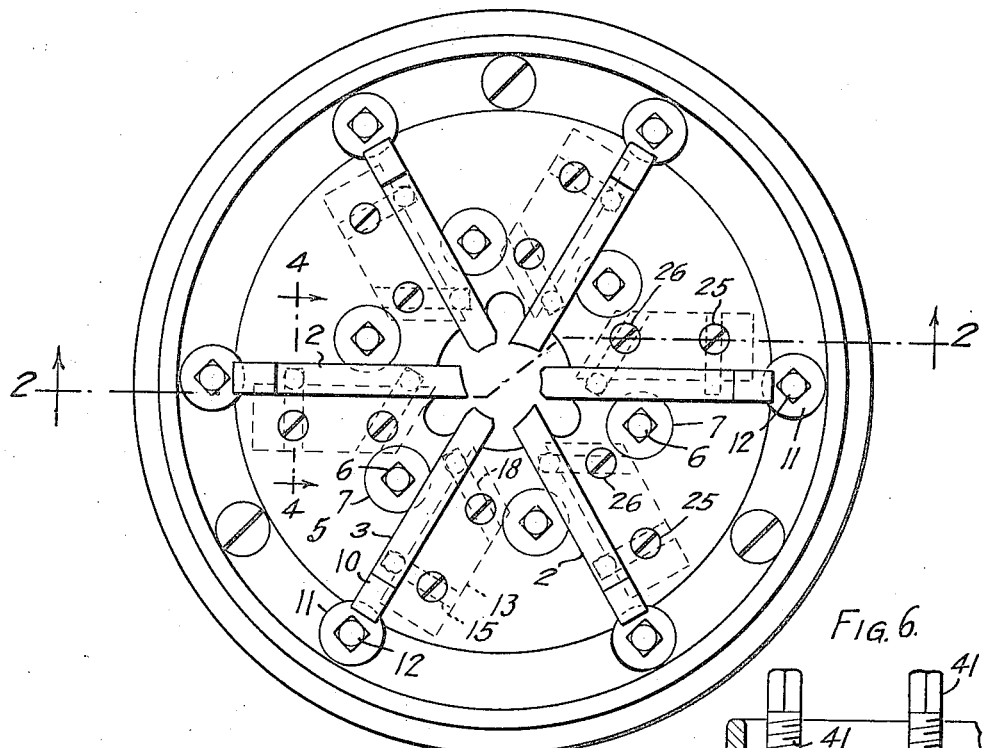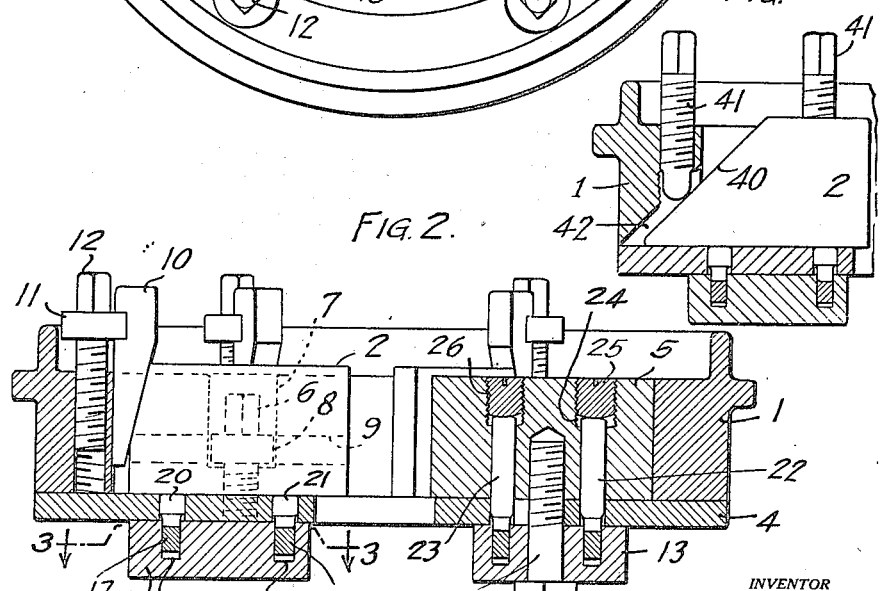

1,458,363

UNITED STATES PATENT OFFICE.

CHARLES L. SAVIEO, OF LIMA, OHIO, ASSIGNOR TO WALTER H. FOSTER, OF NEW YORK, N. Y.

BLADE-ADJUSTING MECHANISM FOR CUTTER HEADS.

Application filed April 21, 1921. Serial No. 463,293.

*To all whom it may concern:*

Be it known that I, CHARLES L. SAVIEO, a citizen of the United States, residing in Lima, Ohio, have invented certain new and useful Improvements in a Blade-Adjusting Mechanism for Cutter Heads, of which the following is a specification.

My invention relates to cutter heads and similar apparatus used for turning bolt blanks and the like. In such cutter heads the cutting edges of the blades may wear more at one end than at the other so that an angular adjustment is necessary to restore the original cutting line. Also for turning a taper on a blank the edges of the cutting blades have to be set angularly to the axis of rotation. My invention provides improved means for varying the angularity of blades for either of these purposes.

The accompanying drawings illustrate embodiments of the invention.

Fig. 1 is a plan and Fig. 2 is a cross-section on the line 2—2 of Fig. 1 showing a cutter head with adjustable blades;

Fig. 3 is a horizontal section taken approximately on the line 3—3 of Fig. 2, illustrating a detail;

Fig. 4 is a horizontal section on the line 4—4 of Fig. 1;

Fig. 5 is a diametral section of another style of cutter head;

Fig. 6 is a section similar to Fig. 2 of a modified construction.

Referring to the embodiment of the invention illustrated, the cutter head comprises an outer ring 1 which is fastened in the machine and carries cutting blades 2 and centering blades 3. The head is closed at one end, except for a central opening for the work, by means of an end plate 4, and the blades are held in position by means of spacing blocks 5 of approximately triangular shape fastened on the end plate by means of screws 6 having heads depressed in sockets 7 of the spacers. Each of these fastening screws has a ring or shoulder 8 and each blade has a transverse groove 9 engaging the ring 8 and by which the blade is held down against movement in an axial direction but is free to be adjusted radially. Each blade may be adjusted inward by means of a cam 10 bearing on the oblique outer edge of the blade and moved up or down by engagement with a shoulder or ring 11 on a screw 12 which is threaded into an opening in the outer ring 1 of the head.

The apparatus thus far described is of a common construction. My improvement is applicable to this type of cutter heads and to various other types and to cutter heads used in various types of turning machines both horizontal and vertical.

The groove 9 on the blade engages the shoulder 8 of the screw with sufficient play to permit angular adjustment of the blade. On the underside of the end plate 4 there are a number of blocks 13 each fastened in place by means of a screw 14 and each having a pair of grooves 15 and 16 extending across its upper face and forming sockets for rockers 17 and 18 placed in the manner shown in Figs. 3 and 4. Each rocker has a projection 19 on its lower edge which is rounded and fits into a corresponding depression in the block or holder 13. These two rockers are so placed that their projecting ends extend under the blades, one rocker of each pair being located near the outer edge of the blade and the other rocker near the inner edge. The movement of the free ends of the rockers is transmitted upward to the blades through pins 20 and 21 resting on the rockers and passing freely through openings in the end plate 4 of the head. On the inner ends of the blades bear pins 22 and 23 which pass up through the end plate and through the spacing block 5 and into sockets 24 which are formed in the upper portions of said spacers and which are threaded to receive screws 25 and 26 exposed at the upper end of the cutter head or accessible therefrom. When the screws 25 and 26 are screwed down in the axial direction their movement is transmitted in an upward direction to the corresponding blade. When the angle of the blade is to be changed the screw 26 will be withdrawn and the screw 25 correspondingly advanced or vice versa, thus tilting the blade to throw the upper end of its cutting edge inward or outward as the case may require.

The means for transmitting the movement of the adjusting screws or equivalent devices to the blades may be considerably varied. Fig. 5, for example, shows a design which is preferable for cutter heads carrying very long blades. The blades 27 in this case are carried within a long ring 28 with an end plate 29 and are adjusted inward by means of a pair of wedges 30 and 31 having beveled contacting faces; the wedge 31 being moved vertically by engagement with a ring 32 carried by a screw 33 which is threaded into a socket in the upper end of the ring 28. With this type of cutter head it is preferable to adjust the angularity of the blades by adjusting means acting transversely near the opposite ends of the blades. The adjusting screw 34 is, therefore, provided, screwing into a socket in the end of the ring and bearing on a rod 35 passing freely through the ring to a point where its beveled lower end engages the beveled outer end of a pin 36 moving freely in a transverse direction and having its inner end bearing against the lower part of the wedge 31; so that when the screw 34 is advanced the lower end of the blade is thrown inward. A similar screw 37 also accessible at the upper end of the ring bears on a vertical rod 38 with a beveled lower end which forces inward the transverse pin 39 bearing against the upper part of the wedge 31; so that when the screw 37 is advanced the upper end of the blade will be forced inward.

A pair of adjusting screws and transmitting devices therefrom will be applied to each of the blades, or to the cutting blades alone as circumstances may require. The same is true of the design shown in Figs. 1 and 2, although in the latter case the adjustment is shown for the centering blades as well as for the cutters.

In the design of Fig. 6 the radial adjustment is effected without the interposition of a separate wedge, such as 10, Fig. 2, at the back of the blade. For this purpose the rear edge 40 of the blade 2 is made oblique and extended to a point below the rounded end of the adjusting screw 41, a slot 42 being formed in the ring 1 to receive the end of the blade. The blade being unclamped may be adjusted inward by screwing down the screw 41. This scheme simplifies the construction and may be applied to cutter heads either with or without the tilting adjustment shown.

The construction, Fig. 6, is in fact particularly adapted for use in connection with devices for tilting the blades since such a tilting operation can take place easily above the contact of the adjusting screw 41 with the edge 40 without varying the character of engagement of the parts at this point.

Though I have described with great particularity of detail certain specific embodiments of my invention yet it is not to be understood therefrom that the invention is restricted to the particular embodiments disclosed. Various modifications thereof in detail and in the arrangement of the parts may be made by those skilled in the art without departure from the invention as defined in the following claims.

What I claim is—

1. A cutter head carrying blades, means for varying the angularity of the blades and additional means for adjusting the blades radially.

2. A cutter head carrying blades, means for varying the angularity of the blades and an additional adjusting screw bearing on the oblique rear end of each blade for adjusting it radially.

3. A cutter head carrying blades with oblique rear edges and having adjusting screws bearing on such edges so as to permit a tilting movement of the blades, in combination with means for tilting the blades.

4. A cutter head carrying blades having oblique rear edges and vertical screws bearing directly on such edges and serving to adjust the blades radially and to permit a tilting movement thereof, in combination with means for tilting the blades.

In witness whereof, I have hereunto signed my name.

CHARLES L. SAVIEO.